(12) United States Patent
Natori (10) Patent No.: US 11,216,228 B2
(45) Date of Patent: Jan. 4, 2022

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Takuya Natori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/895,972

(22) Filed: Jun. 8, 2020

(65) Prior Publication Data

US 2020/0394006 A1    Dec. 17, 2020

(30) Foreign Application Priority Data

Jun. 12, 2019    (JP) .............................. JP2019-109724

(51) Int. Cl.
*G06F 3/12* (2006.01)

(52) U.S. Cl.
CPC ............ *G06F 3/1254* (2013.01); *G06F 3/125* (2013.01); *G06F 3/1208* (2013.01); *G06F 3/1256* (2013.01); *G06F 3/12* (2013.01); *G06F 3/1201* (2013.01); *G06F 3/1204* (2013.01)

(58) Field of Classification Search
CPC .... G06F 3/1254; G06F 3/1208; G06F 3/1256; G06F 3/125; G06F 3/1204; G06F 3/12; G06F 3/1201

USPC ......................................................... 358/1.15
See application file for complete search history.

(56) References Cited

U.S. PATENT DOCUMENTS

| 2011/0273740 | A1* | 11/2011 | Yang ..................... G06F 3/1208 358/1.15 |
| 2012/0050782 | A1* | 3/2012 | Kawasaki ............. G06F 3/1255 358/1.14 |
| 2012/0191653 | A1* | 7/2012 | Ogura .................... G06F 16/13 707/636 |
| 2013/0188220 | A1* | 7/2013 | Suzuki .................... H04N 1/38 358/1.15 |
| 2017/0094086 | A1* | 3/2017 | Nomoto ............. H04N 1/00588 |
| 2019/0065215 | A1* | 2/2019 | Mitsui ................... G06F 9/4411 |

FOREIGN PATENT DOCUMENTS

JP    2005-182694 A    7/2005

\* cited by examiner

*Primary Examiner* — Miya J Williams
*Assistant Examiner* — Darryl V Dottin
(74) *Attorney, Agent, or Firm* — Canon U.S.A., Inc. I.P. Division (57) ABSTRACT

An information processing device includes an acquisition unit and a setting unit. The acquisition unit acquires a selection result indicating whether a print processor is used for a process related to a print layout. The setting unit sets, in accordance with the selection result and as a print processor used for a printer driver associated with a printer device, a print processor associated with the printer driver.

4 Claims, 10 Drawing Sheets

INFORMATION PROCESSING DEVICE, INFORMATION PROCESSING METHOD, AND STORAGE MEDIUM

BACKGROUND

Field

An aspect of the embodiments relates to an information processing device, an information processing method, and a storage medium.

Description of the Related Art

It is known that a printer driver is used when data created by an application is printed by a printer device selected for output. In such a case, the printer driver has a role of converting the data created by the application into print data whose format can be used by the printer device selected for output.

A printer driver can set setup information related to printing (for example, determine or update setup information). As a more specific example, it is possible to perform the Nin1 printing in which a plurality of logical pages are aggregated and printed on one physical page or enlargement/reduction printing to print a document created by an application at a scale different from the size designated by the application. A printer driver creates print data by performing enlargement, reduction, rotation, or the like of an object forming document data based on the above setup information and document data. As a scheme for realizing these functions, a scheme of using a print processor that is a preprocess module of a printer driver is known. Japanese Patent Application Laid-Open No. 2005-182694 discloses performing rendering by using a print processor.

SUMMARY

Compared to a print processor having a restriction as a preprocess module, there are many functions that can be realized by a module associated with the printer driver (hereinafter, also referred to as "driver-related module"), which operates in cooperation with a printer driver independently. In contrast, with some print systems in which a plurality of printer devices or a plurality of printer drivers are embedded or with some types of applications, it may be difficult for the driver-related module, which operates in cooperation with a printer driver independently, to operate correctly, as described above. From such a background, in accordance with an environment in which a printer driver is used, there may be a situation where a user is allowed to select which of a print processor or a driver-related module is used for a process related to a print layout for realizing various functions described above.

When a print processor is used for a process related to a print layout, a command that instructs a print processor to be responsible for a print layout is issued from a printer driver. In such a case, to correctly process the instruction of a print layout, it is desirable that a print processor used by a printer driver for a process related to a print layout be a print processor associated with the printer driver. However, setup information on a print processor used by a printer driver for a process related to a print layout is under the control of operating system (OS), which is basic software, and therefore may be easily changed by an administrator of the OS.

As another example, when a specification of a printer driver that has not been packed with a print processor in an older version is changed so as to be packed with a print processor in a newer version, the same phenomenon occurs when upgrading of a printer driver is performed. In such a case, since a print processor has not been packed in the older version, a print processor prepared by the OS is used for a process related to a print layout, for example. When a printer driver is upgraded to a newer version, the print processor packed in the newer version is registered in the OS. On the other hand, in such a case, as setup information related to a print processor used by a printer driver for a process related to a print layout, setup information on the older version is taken over. Thus, a print processor prepared by the OS that is different from the print processor associated with the printer driver of the newer version is used for a process related to a print layout.

As described above, in a state where a print processor used for a process related to a print layout is not a print processor associated with a printer driver, setup information related to a print layout may not be correctly reflected to a print result. In such a case, the print result may be a result that a user does not intend to obtain.

According to an aspect of the present disclosure, an information processing device includes an acquisition unit configured to acquire a selection result indicating whether a print processor is used for a process related to a print layout, and a setting unit configured to set, in accordance with the selection result and as a print processor used for a printer driver associated with a printer device, a print processor associated with the printer driver.

Further features of the present disclosure will become apparent from the following description of exemplary embodiments with reference to the attached drawings.

DESCRIPTION OF THE EMBODIMENTS

The following embodiments do not limit the present disclosure according to claims. Further, not all of combinations of features described in each embodiment are necessarily essential to the solution in the present disclosure.

First Embodiment

Figure 1:
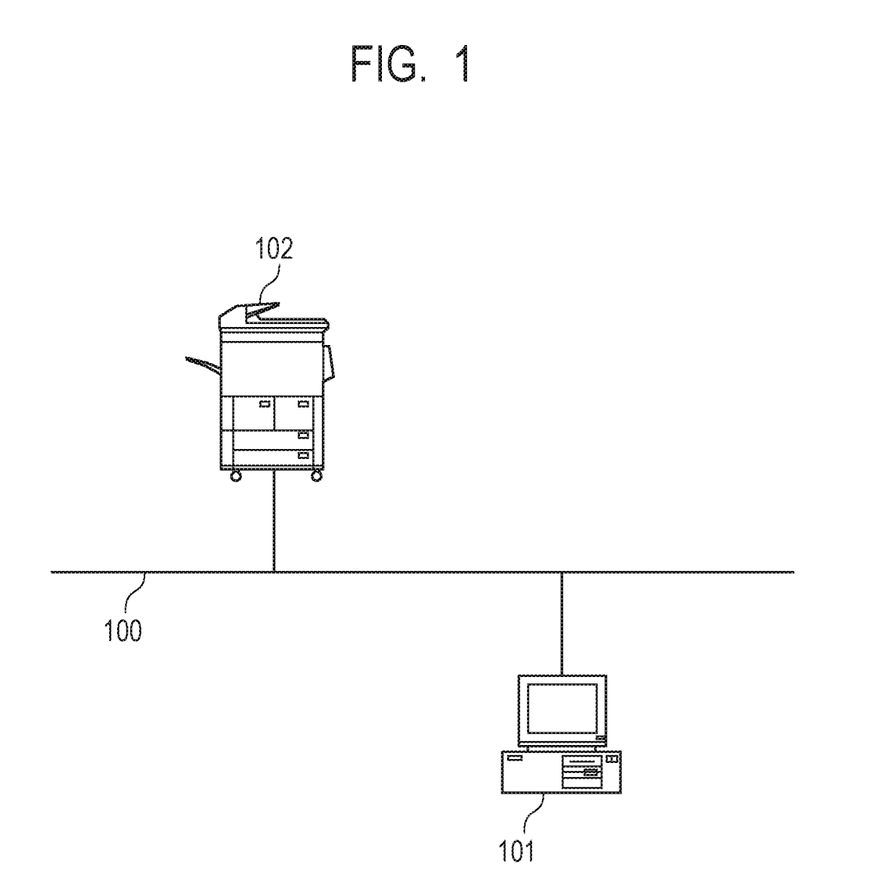
FIG. 1 is a diagram illustrating an example of a system configuration of a print system.

FIG. 1 is a diagram illustrating an example of a system configuration of a print system according to the present embodiment. The print system according to the present embodiment has an information processing device 101 and a printer device 102 that receives and prints print data in a page description language (PDL) format. Each device can communicate with each other via a network 100 including a wide area network (WAN). Note that, as another example, the network 100 may be a network including a local area network (LAN), the Internet, or the like. Further, the network 100 may be any of a wired network or a wireless network. Further, the network 100 may include a plurality of networks. In such a case, the network 100 may include different types of multiple networks.

Figure 2:
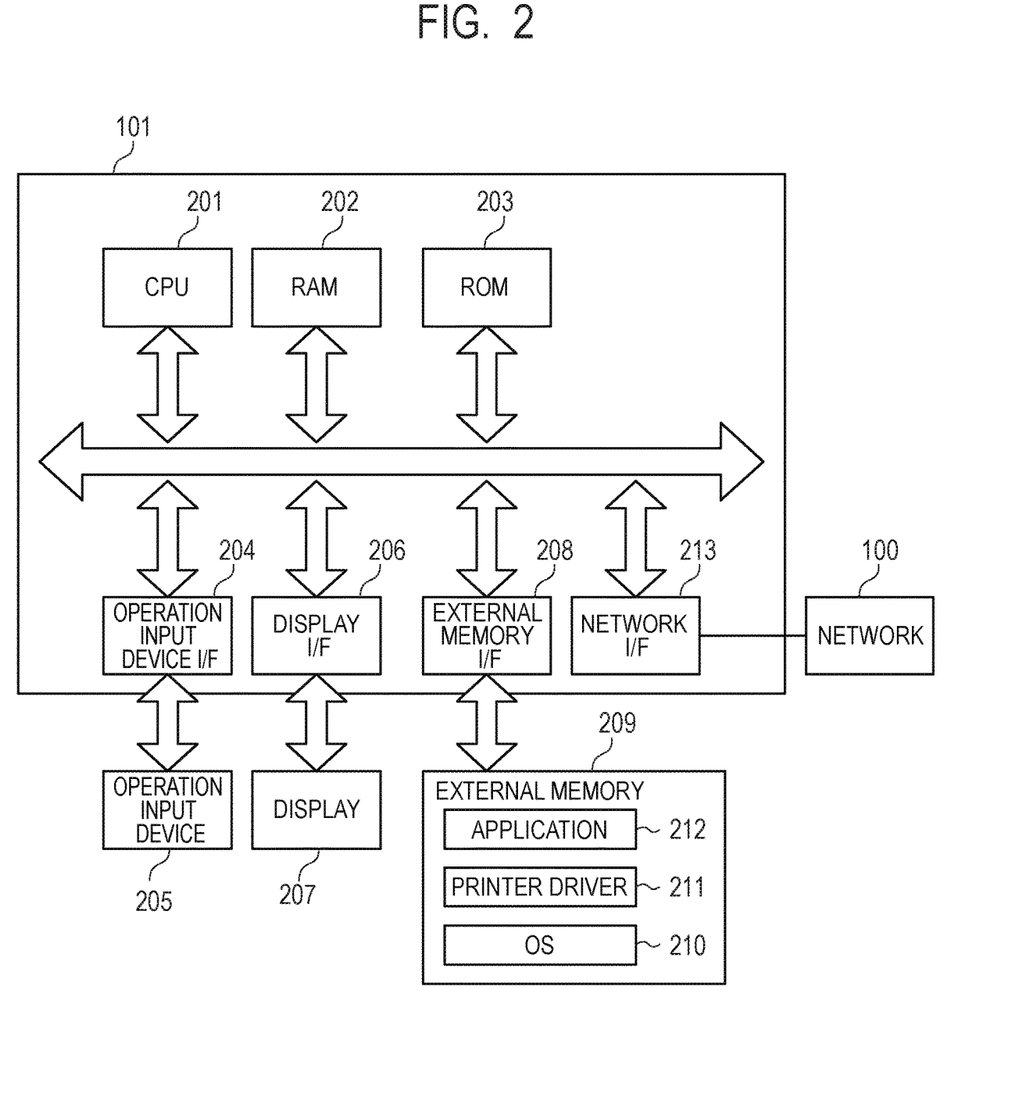
FIG. 2 is a diagram illustrating an example of a hardware configuration or the like of an information processing device.

FIG. 2 is a diagram illustrating an example of a hardware configuration or the like of the information processing device 101. As illustrated in FIG. 2, the information processing device 101 includes a central processing unit (CPU) 201, a random access memory (RAM) 202, a read only memory (ROM) 203, and various interface (I/F) including an operation input device I/F 204, a display I/F 206, an external memory I/F 208, and a network I/F 213.

The CPU 201 controls various operations of the information processing device 101. For example, the CPU 201 may control the operation of the overall information processing device 101. That is, the CPU 201 corresponds to an example of a control unit in the information processing device 101. The RAM 202 is a main storage memory of the CPU 201 and is used as a work area or a temporary storage region for loading various programs. The ROM 203 stores a control program, a boot program, or the like that can be executed by the CPU 201. The external memory 209 connected to a control unit via the external memory I/F 208 stores a program for OS 210, a printer driver 211, an application 212, and the like.

Figure 7:
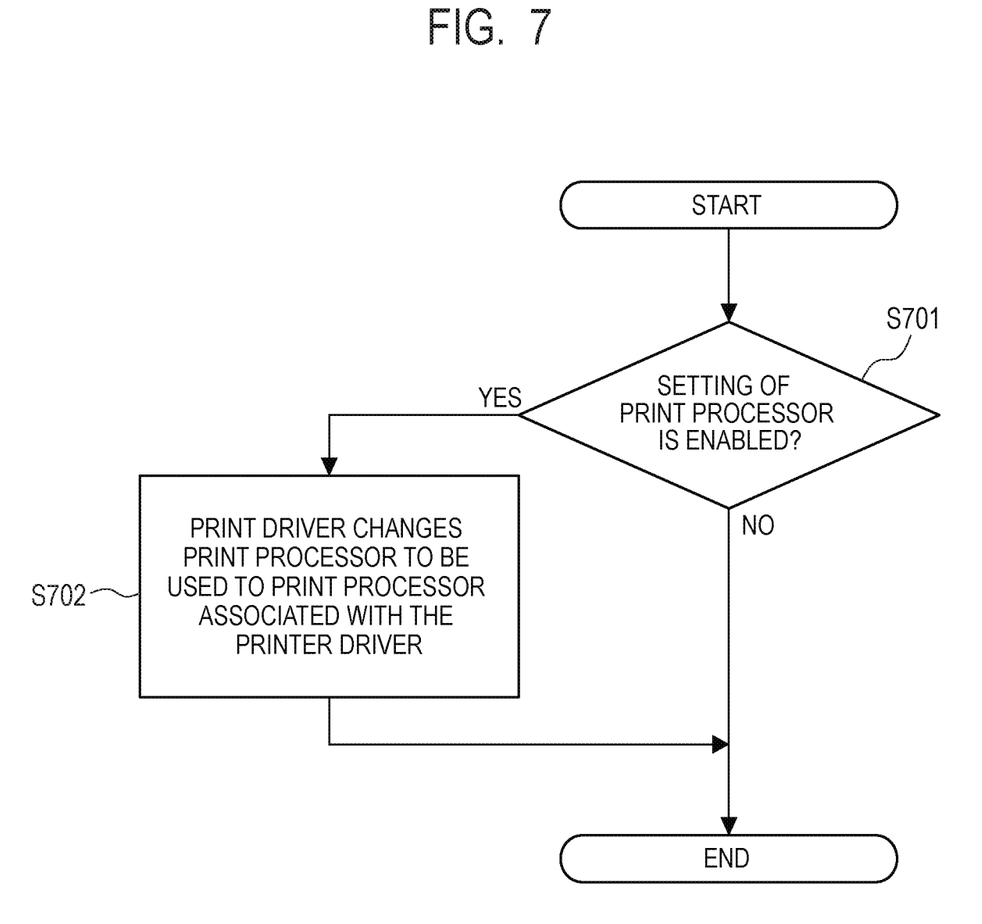
FIG. 7 is a flowchart illustrating an example of a process for changing a print processor.
Figure 9:
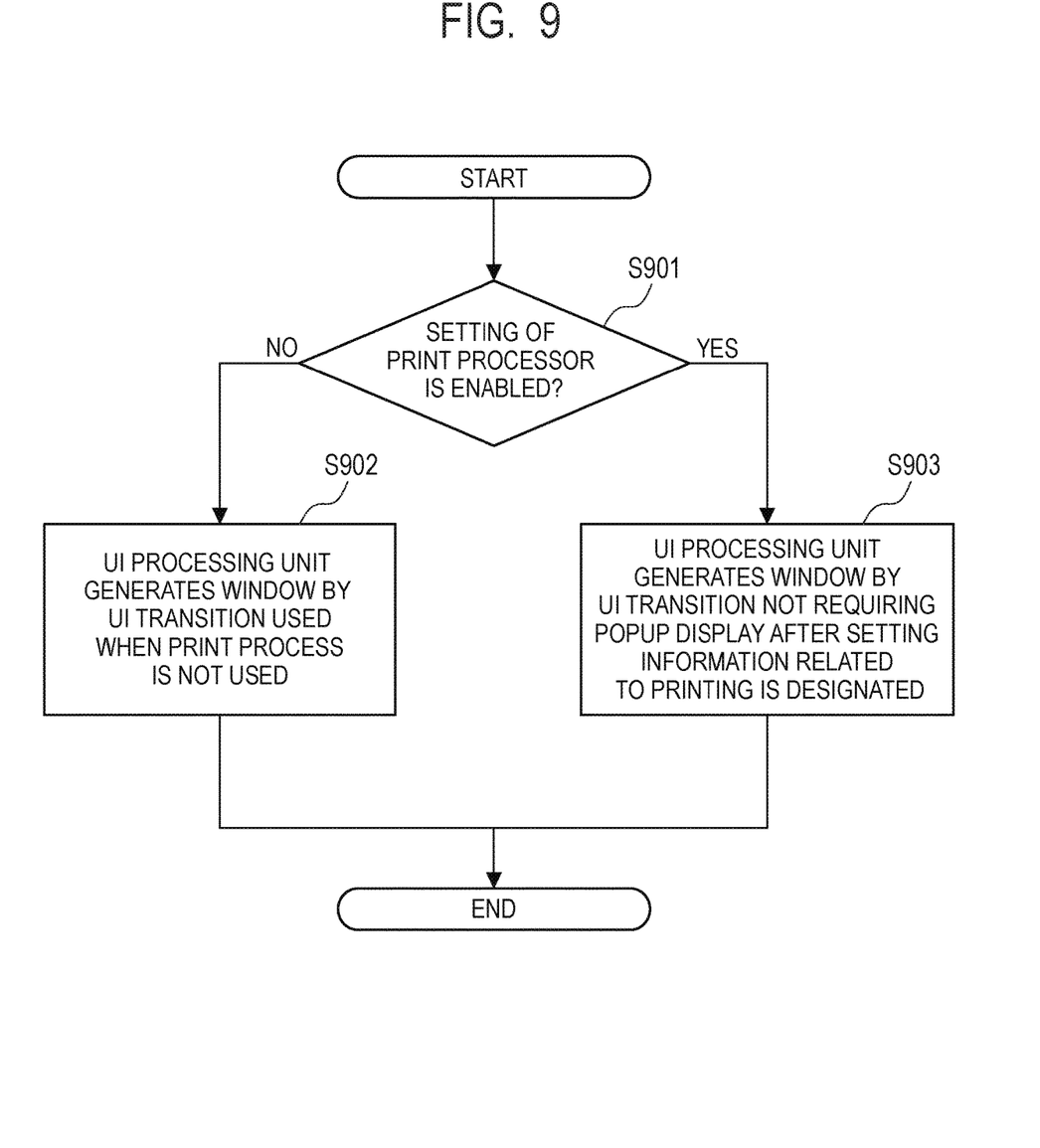
FIG. 9 is a flowchart illustrating an example of a process related to window generation.
Figure 10:
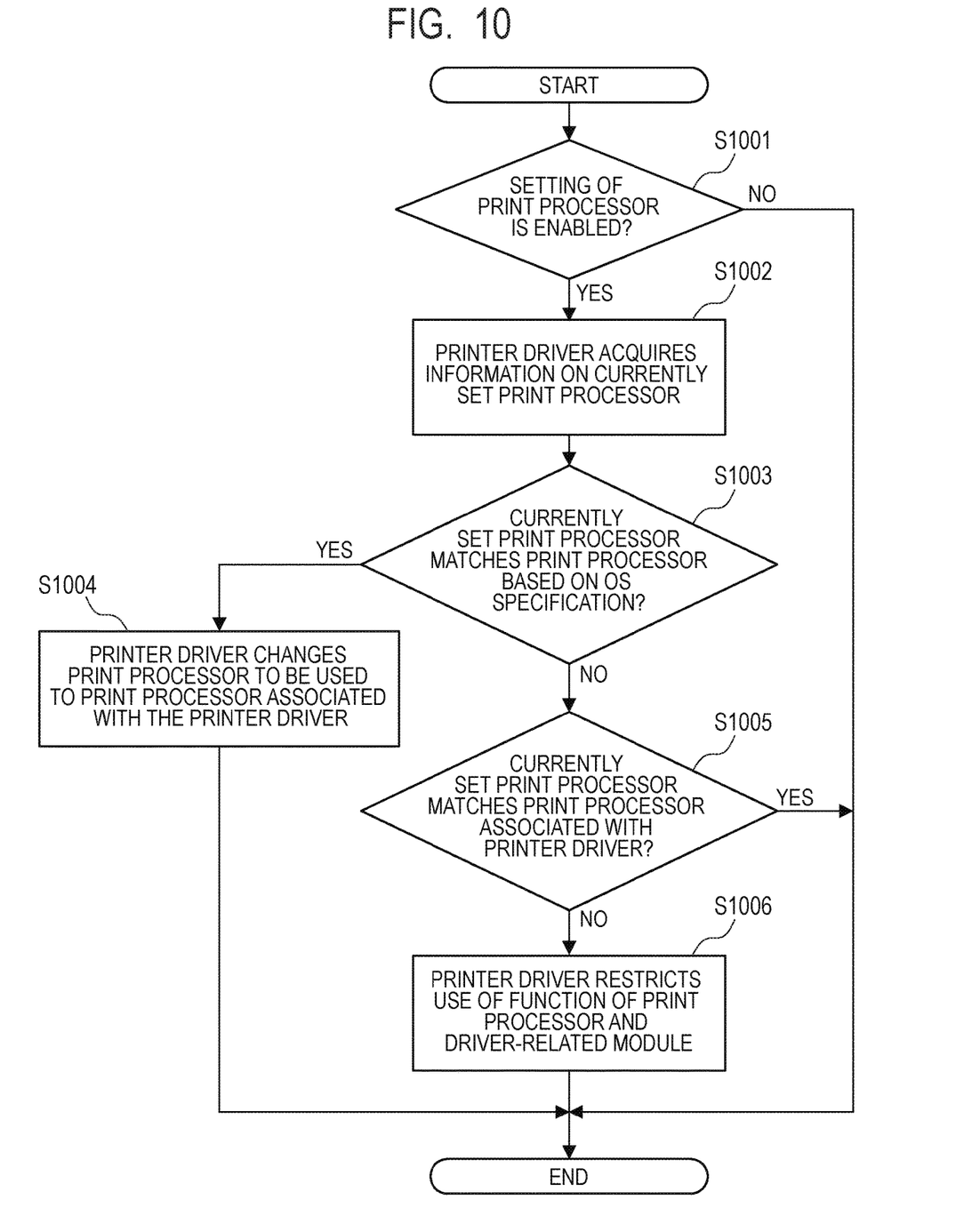
FIG. 10 is a flowchart illustrating an example of a process when various setup information is set.

More specifically, the CPU 201 loads a program stored in the ROM 203 or the external memory 209 to the RAM 202. Further, when the CPU 201 executes the program loaded on the RAM 202, various control such as control of a UI screen, generation of print data, or transfer of the print data is performed. In the present embodiment, when the CPU 201 executes the above programs, functions of the information processing device 101 described later in FIG. 4 and FIG. 5 and processes in the information processing device 101 such as processes of flowcharts described later in FIG. 7, FIG. 9, and FIG. 10 are implemented.

In the present embodiment, while the external memory 209 is a hard disk drive (HDD), a nonvolatile memory such as a solid state drive (SSD) may be used as another example.

The operation input device I/F 204 is an interface used for controlling the operation input device 205 such as a keyboard, a pointing device (mouse), or a touch input device. The operation input device 205 functions as an accepting unit that accepts a user's operation. The display I/F 206 controls display of a window on a display 207. The display 207 functions as a display unit that displays information to a user.

The information processing device 101 is connected to the network 100 via the network I/F 213. The network I/F 213 transmits print data to the printer device 102 connected to the network 100. Note that, in the present embodiment, the CPU 201 performs data communication based on a wireless communication with an external terminal connected to the network 100 via the network I/F 213 complying with IEEE 802.11 series. Note that a communication scheme for implementing data communication is not particularly limited, and the CPU 201 may use communication via a mobile communication system such as LTE or 5G or communication via a wired cable such as a LAN cable for data communication, for example. Further, the CPU 201 may use communication in which multiple communication schemes for data communication are combined.

Figure 3:
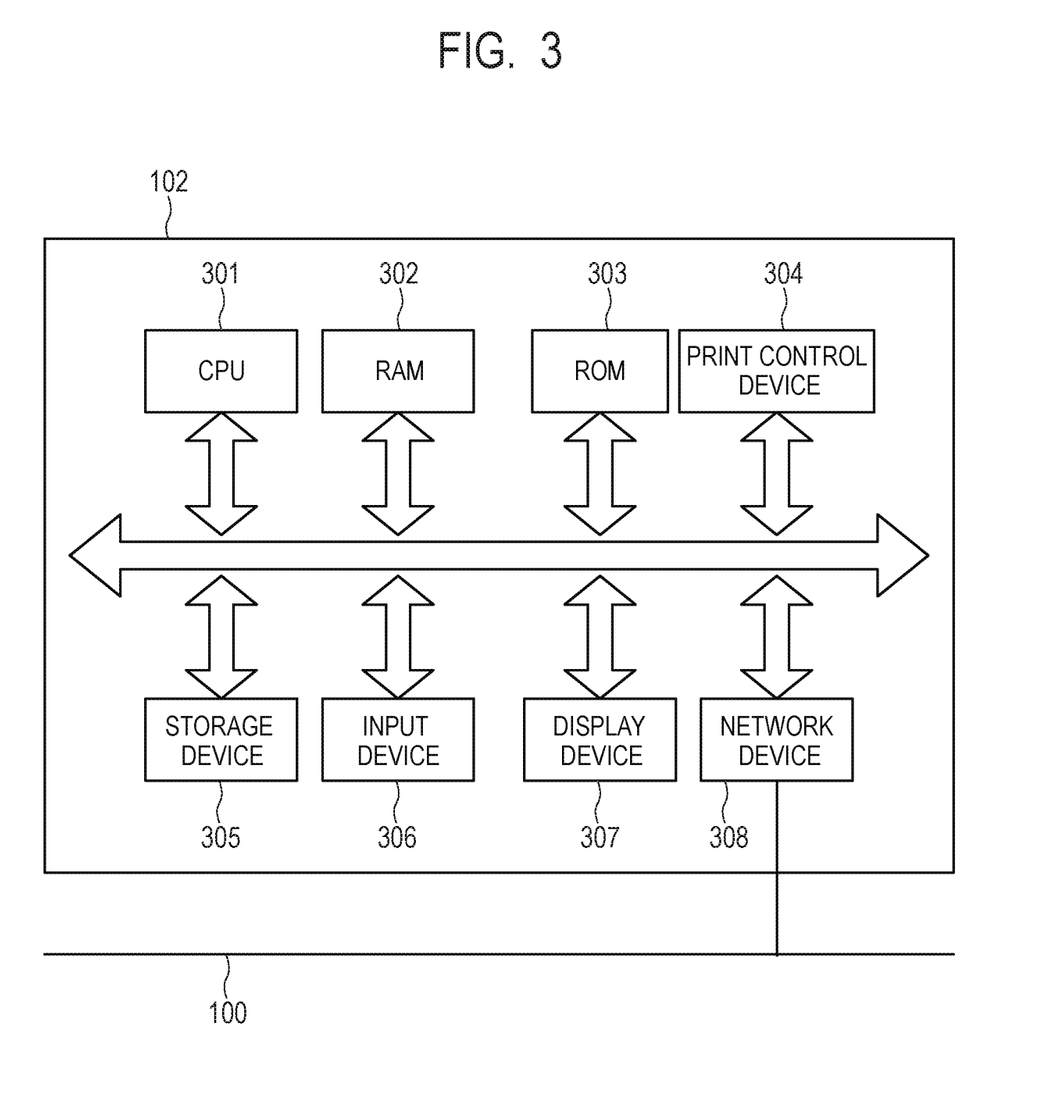
FIG. 3 is a diagram illustrating an example of a hardware configuration of a printer device.

FIG. 3 is a diagram illustrating an example of a hardware configuration of the printer device 102. As illustrated in FIG. 3, the printer device 102 includes a CPU 301, a RAM 302, a ROM 303, a print control device 304, a storage device 305, an input device 306, a display device 307, and a network device 308.

The CPU 301 controls various operations of the printer device 102. For example, the CPU 301 may control the operation of the overall printer device 102. That is, the CPU 301 corresponds to an example of a control unit in the printer device 102. The RAM 302 is a main storage memory of the CPU 301 and is used as a work area or a temporary storage region for loading various programs. The ROM 303 stores a control program, a boot program, or the like that can be executed by the CPU 301. The storage device 305 stores programs of a function of the printer device 102 and a process executed in the printer device 102.

The input device 306 may be formed of a numerical keypad, various buttons, or the like. The print control device 304 loads print data included in a print job to the RAM 302 and executes printing to output a print material. When the CPU 301 performs a process in accordance with a program stored in the ROM 303 or the storage device 305, the function of the printer device 102 and the process of the printer device 102 are implemented.

Figure 4:
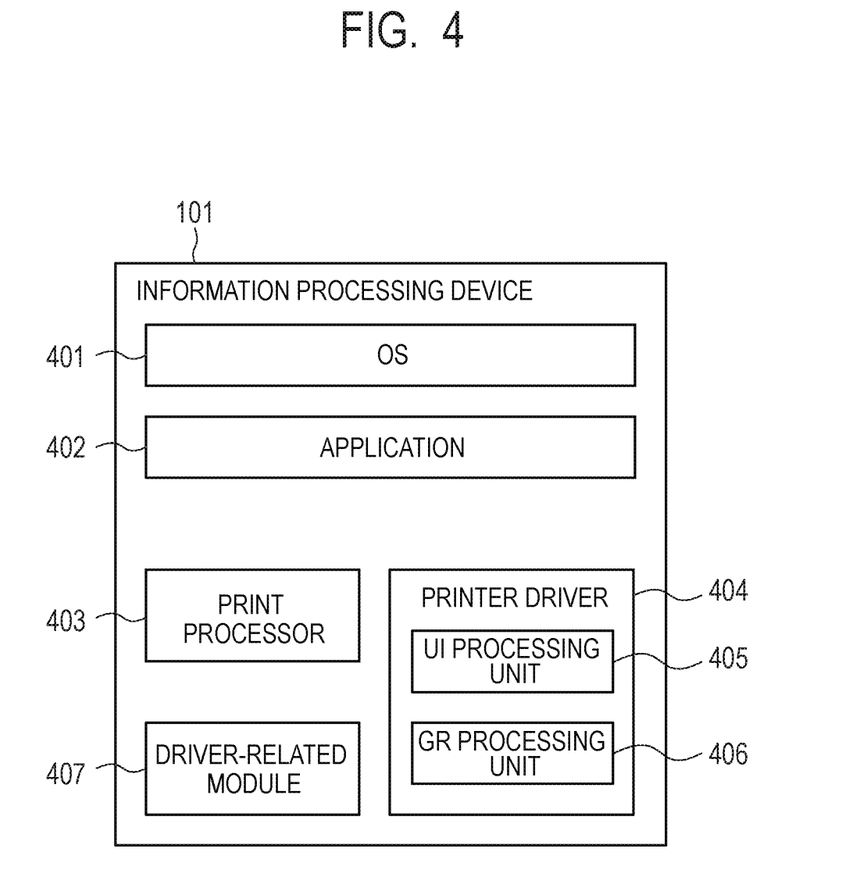
FIG. 4 is a diagram illustrating an example of a software configuration of the information processing device.

FIG. 4 is a diagram illustrating an example of a software configuration of the information processing device 101. As illustrated in FIG. 4, the information processing device 101 includes OS 401, an application 402, a print processor 403, a printer driver 404, and a driver-related module 407. The OS 401 performs basic control of the information processing device 101. The application 402 realizes various functions by performing various processes in cooperation with the OS 401. As a more specific example, a function related to printing is also realized by the application 402. In such a case, the application 402 sets various setup information used for printing and issues instructions related to printing, for example.

In the present embodiment, a printer driver corresponds to a function of controlling a printer device. Further, a print processor corresponds to a function of supporting a print process performed by the printer driver via a printer device.

The print processor 403 processes a print job spooled in the printer device 102. More specifically, the print processor 403 receives setup information or an instruction related to printing from the application 402 via the OS 401 and performs a process for implementing printing. At this time, the print processor 403 transmits, to the printer device 102, print data that is generated in cooperation with the printer driver 404 and can be interpreted by the printer device 102. The function of the print processor 403 is realized when a process of a spooler service 502 is performed by the OS 401 described later in FIG. 5. Note that, as another example, a function of the print processor 403 may be realized when a process different from the spooler service 502 is performed by the OS 401.

The printer driver 404 includes a UI processing unit 405 and a graphics rendering (GR) processing unit 406. When setup information related to printing is set by the application 402, the UI processing unit 405 performs a process in accordance with output of a window used for setting the setup information. The GR processing unit 406 generates print data that can be interpreted by the printer device 102 based on the set setup information related to the printing described above.

The driver-related module 407 performs a process related to printing such as a process related to a print layout in cooperation with the printer driver 404. The print layout corresponds to setup information indicating what image is to be printed as a print target, and how the print target is arranged on the printing medium is set. Further, the process related to the print layout is a process for setting what image a print target is to be printed, for example, a process for setting how many images are to be included in a single printing medium and printed, what size of the image is to be printed, or the like. Note that, as another example, the driver-related module 407 may perform a process for realizing a function of print preview or an aggregation function of a plurality of print jobs without being limited to a process related to the print layout.

Figure 5:
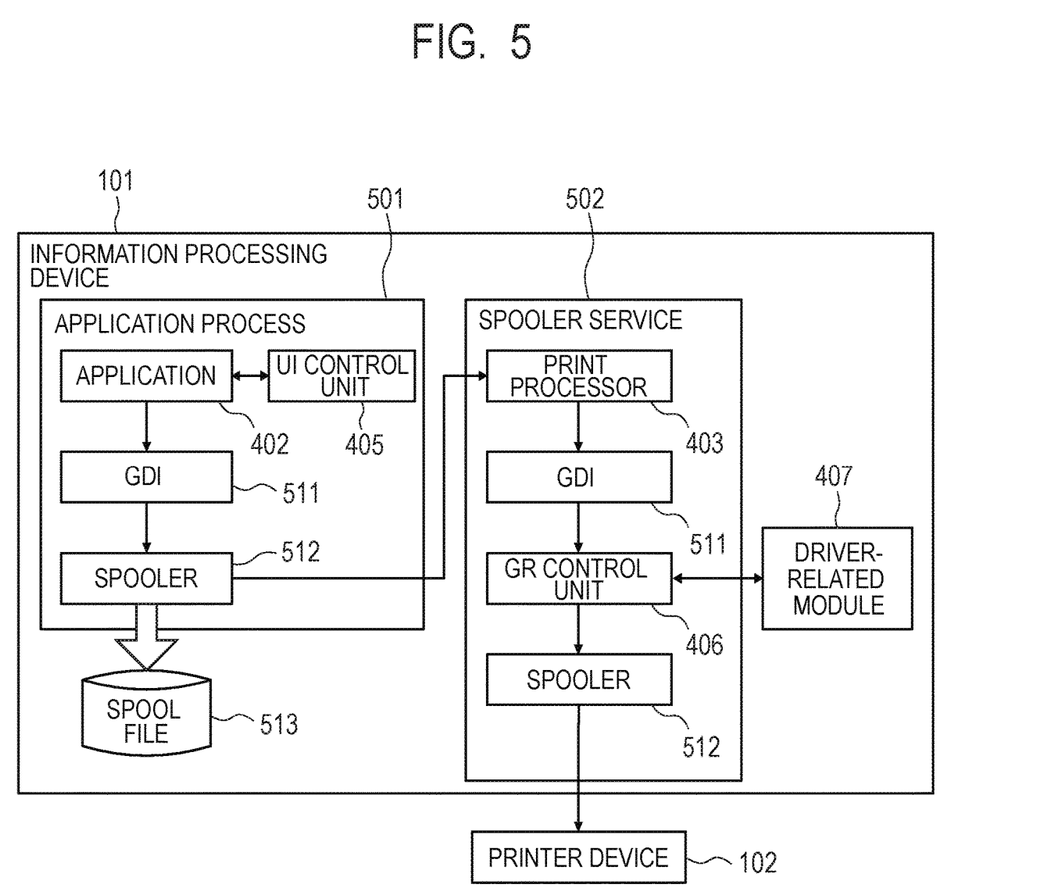
FIG. 5 is a diagram illustrating an example of a print processing flow.

FIG. 5 is a diagram illustrating an example of a print process according to the present embodiment. In the information processing device 101, the application 402, the UI processing unit 405, the print processor 403, the GR processing unit 406, a graphics device interface (GDI) 511, and a spooler 512 perform a print process in association with each other. The print process includes an application process 501 and the spooler service 502. The application process 501 is a series of processes related to setting various setup information on printing or issuing an instruction related to printing. Further, the spooler service 502 is a series of processes related to a process of a print job spooled in the printer device 102. The GDI 511 corresponds to a function of generating drawing data representing an image (that is, a print image) of the printing medium to be printed by the printer device by drawing a print target and is provided by the OS 401. The application 402 and the print processor 403 can generate drawing data of the print target by invoking API of the GDI 511. The spooler 512 corresponds to a function responsible for performing a process related to creation of a spool file 513 described later or a process related to transmitting print data to the printer device 102 and is provided by the OS 401. The program of the GDI 511 or the spooler 512 is stored in the external memory 209.

Here, details of the process performed as the application process 501 will be described more specifically. The application 402 invokes the UI processing unit 405 to set setup information related to printing appropriately. The application 402 then invokes an API of the GDI 511 and outputs the setup information related to printing or data of a print target to the GDI 511.

The GDI 511 generates drawing data based on data of a print target output from the application 402. The GDI 511 causes the spooler 512 to create the spool file 513 based on the generated drawing data and the setup information related to printing output from the application 402. The spool file 513 is intermediate data representing setup information related to printing or drawing data and is used for spooling a print job related to printing of the drawing data for the printer device 102.

While the spooler 512 causes the RAM 202 to temporarily store the spool file 513 in the present embodiment, the spool file 513 may be stored in the external memory 209 as another example. The spool file 513 is expressed in an enhanced meta file (EMF) format, for example. Further, setup information or drawing data included in the spool file 513 is expressed by a drawing command of the GDI 511.

Next, details of the process performed as the spooler service 502 will be described more specifically. In response to compression of the series of processes described as the application process 501, the print processor 403 issues a drawing instruction of the spool file 513 by invoking the API of the GDI 511. By receiving the drawing instruction from the print processor 403, the GDI 511 replaces a device driver interface (DDI) with an interface associated with the printer driver 404 and then invokes the GR processing unit 406. The GR processing unit 406 generates print data that reflects the setup information related to printing and the drawing data by using a page description language that can be interpreted by the printer device 102. Further, as another example, the GR processing unit 406 may implement a process related to, in particular, a print layout as a process related to printing in cooperation with the driver-related module 407 in accordance with the setup information set in the printer driver 404. The GR processing unit 406 then outputs the print data that can be interpreted by the printer device 102 to the spooler 512. The spooler 512 transmits the print data output from the GR processing unit 406 to the printer device 102. In such a way, in the printer device 102, the print process is performed based on the print data.

Figure 6:
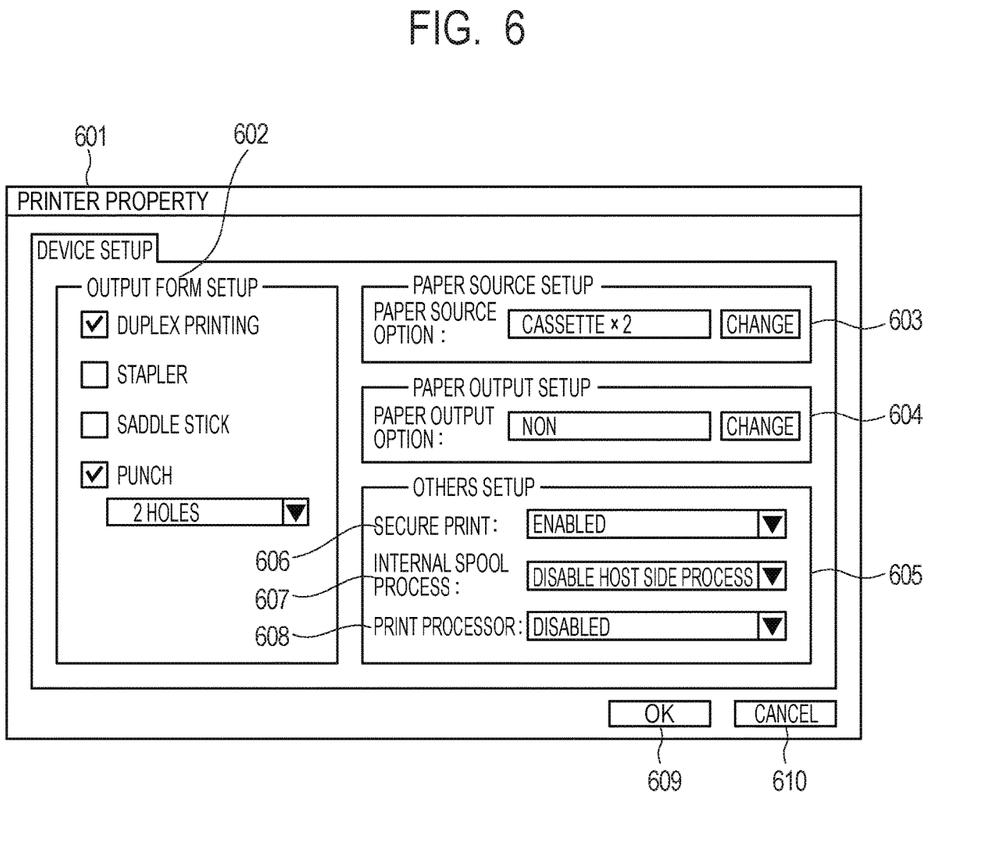
FIG. 6 is a diagram illustrating an example of a user interface (UI) used for setting setup information.

FIG. 6 is a diagram illustrating an example of a UI used for setting setup information of a device in the printer driver 404. When receiving an instruction for setting the setup information related to printing from the application 402, the printer driver 404 displays and thus presents a property window 601 on the display 207 to a user. In the present embodiment, information on the property window 601 is stored in the external memory 209 in advance. When information is input to the property window 601 of the printer device 102 from the user who has administrator authority of the OS 401, various setup information managed by the printer driver 404 associated with the printer device 102 is set. For example, as illustrated in FIG. 6, the property window 601 includes an output form setup region 602, a paper source setup region 603, a paper output setup region 604, and an others setup region 605. The output form setup region 602 is a region that accepts designation of setup information with respect to a function related to an output form of the printer device 102 from the user. More specifically, the user uses the operation input device 205 to perform entry to the output form setup region 602 and accordingly is able to designate setup information related to a print form such as duplex printing, with or without stapling, with or without saddle stitch, and with or without punch in accordance with the function of the printer device 102. The paper source setup region 603 is a region that accepts, from the user, designation of setup information with respect to a function related to a paper source of the printer device 102. Further, the paper output setup region 604 is a region that accepts, from the user, designation of setup information on a function related to paper output of the printer device 102.

The others setup region 605 is a region that accepts designation of setup information on the other functions of the printer device 102 from the user. In the present embodiment, the others setup region 605 includes a secure print setup region 606, an internal spool process setup region 607, and a print processor setup region 608.

The internal spool process setup region 607 is a region that accepts, from the user, designation as to whether or not to enable the internal spool process in the information processing device 101. When "Disable host side process" is designated for the internal spool process setup region 607, the printer driver 404 disables the function of the print processor 403 and the driver-related module 407. Accordingly, the printer driver 404 restricts a use of at least some of functions out of selectable functions of a layout related to printing. As a more specific example, the printer driver 404 may disable a use of a poster print function, a page number print function, a date print function, and the like as a function related to a print layout. Note that the poster print function is a function of dividing a single document into multiple pages and printing the multiple pages. Further, as another example, the printer driver 404 may restrict options that can be designated as setup information with respect to some functions related to a print layout. Note that, in such a case, when data is routed via the print processor 403 as a data flow, the print processor 403 is not required to perform a particular process, and the driver-related module 407 is not required to operate.

The print processor setup region 608 is a region that accepts, from the user, designation as to whether or not to use the print processor 403 for a process related to a print layout. When "Enable host side process" is designated for the internal spool process setup region 607 and "Enabled" is designated for the print processor setup region 608, the printer driver 404 enables the function of the print processor 403. That is, the printer driver 404 operates in a mode in which the print processor 403 is used for setting the setup information related to a print layout. In such a case, the UI processing unit 405 sets the setup information related to printing so that an instruction related to a print layout that can be processed by the print processor 403 is issued. Note that, when the information processing device 101 operates in the mode described above, the driver-related module 407 is not required to operate. Further, as with the property window 601, a window including the print processor setup region 608 corresponds to an example of "selection window". Further, information indicating whether or not to use the print processor 403 designated in the print processor setup region 608 corresponds to an example of a selection result as to whether or not a print processor is used for a process related to a print layout.

When "Enable host side process" is designated for the internal spool process setup region 607, and "Disabled" is designated for the print processor setup region 608, the printer driver 404 enables the function of the driver-related module 407. That is, the printer driver 404 operates in a mode in which the driver-related module 407 is used for setting of the setup information related to a print layout. In such a case, the UI processing unit 405 sets the setup information related to printing so that an instruction related to a print layout that can be processed by the driver-related module 407 is issued. Note that, in such a case, when data is routed via the print processor 403 as a data flow, the print processor 403 is not required to perform a particular process.

The printer driver 404 reflects the setup information input to the property window 601 as setup information of a device in the printer driver 404 when an OK button 609 is pressed. In contrast, when a cancel button 610 is pressed, the printer driver 404 does not reflect the setup information input to the property window 601 and maintains setup information of a device in the printer driver 404 in the original state.

FIG. 7 is a flowchart illustrating an example of a process when various setup information managed by the printer driver 404 associated with the printer device 102 is set via the property window 601 of the printer device 102. More specifically, FIG. 7 illustrates an example of a process when the printer driver 404 changes the print processor 403 used for a process related to a print layout. In the present embodiment, while the information processing device 101 starts a series of processes illustrated in FIG. 7 when the OK button 609 is pressed, the information processing device 101 may start the processes when an event in accordance with setting of various setup information occurs as another example.

In step S701, the printer driver 404 acquires setup information designated for the print processor setup region 608 and determines whether or not "Enabled" is designated as the setup information. Note that a process in which the printer driver 404 acquires setup information designated for the print processor setup region 608 corresponds to an example of an acquiring process for acquiring a selection result as to whether or not a print processor is used for a process related to a print layout. In step S701, if the printer driver 404 determines that "Disabled" is designated for the print processor setup region 608, the printer driver 404 ends the process of FIG. 7. That is, if "Disabled" is designated for the print processor setup region 608, the printer driver 404 does not perform the process of step S702. Thus, since print settings and generation of print data are not influenced regardless of the print processor 403 used by the printer driver 404 for a process related to the print layout, the information processing device 101 does not change the print processor 403 or the like.

In step S701, if the printer driver 404 determines that "Enabled" is designated for the print processor setup region 608, the printer driver 404 proceeds with the process to step S702. In step S702, the printer driver 404 changes a print processor used for a process related to a print layout from a print processor prepared by the OS to a print processor associated with the printer driver 404. In the present embodiment, the print processor associated with the printer driver 404 is a print processor generated in accordance with the function of the printer driver 404 and is generated as a print processor different from the print processor prepared by the OS.

Further, the same applies to a case where the print processor 403 is changed due to upgrading of the printer driver 404 in accordance with a change of the specification from the older version. As described above, the information processing device 101 starts the series of processes illustrated in FIG. 7 when the OK button 609 is pressed. Thus, even when a print processor to be used is not designated at the time of upgrading of the printer driver 404, the printer driver 404 determines whether or not to use a print processor as long as the property window 601 is used. Further, as long as "Enabled" is designated for the print processor setup region 608 of the property window 601, the printer driver 404 can maintain the state in which a print processor associated with the printer driver 404 is used.

Figure 8A:
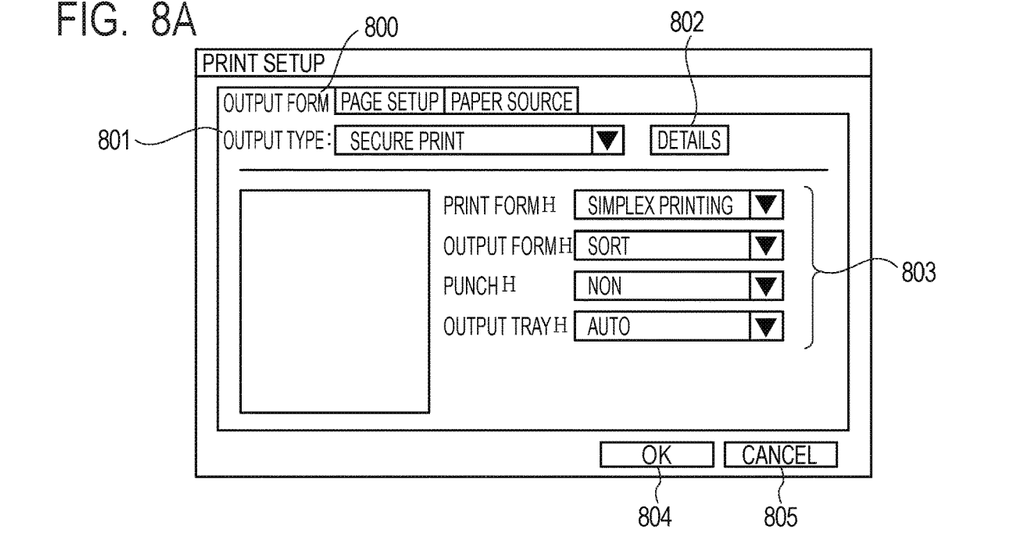
FIG. 8A is a diagram illustrating an example of a UI used for designating setup information related to printing.
Figure 8B:
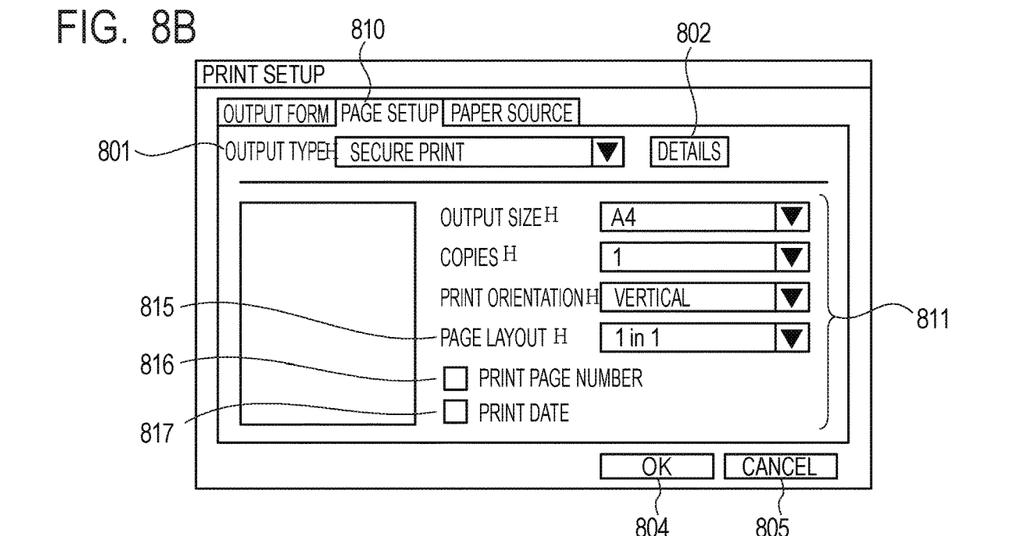
FIG. 8B is another diagram illustrating an example of a UI used for designating setup information related to printing.
Figure 8C:
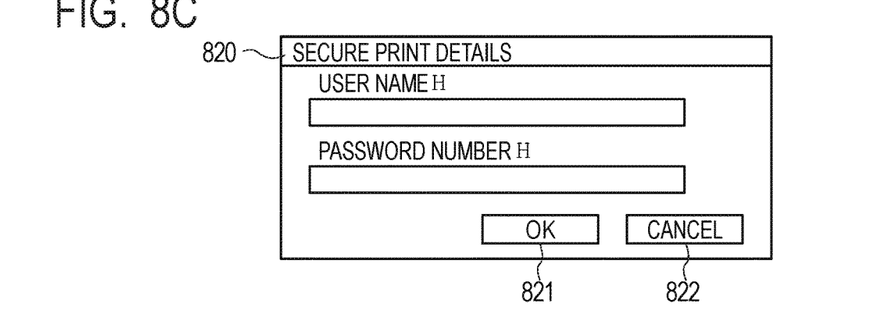
FIG. 8C is yet another diagram illustrating an example of a UI used for designating setup information related to printing.

Setup information designated for the property window 601 is reflected to a UI used for designating setup information related to printing by the UI processing unit 405 invoked by the application 402. FIG. 8A to FIG. 8C are diagrams illustrating an example of a UI used for designating setup information related to printing. FIG. 8A is a diagram illustrating an example of an output form sheet 800 used for setting setup information related to, in particular, an output form out of setup information related to printing. FIG. 8B is a diagram illustrating an example of a page setting sheet 810 used for setting setup information related to, in particular, a page out of setup information related to printing. An output type selection region 801 is a region that accepts, from the user, designation of an output type of a print result. The UI processing unit 405 displays, on the output type selection region 801, "Print" indicating an operation to output a print result without requiring additional entry in particular as one of options. Further, when "Enabled" is designated for the secure print setup region 606, the UI processing unit 405 adds, to the output type selection region 801, "Secure print" indicating operation to request entry related to authentication at the time of printing other than "Print" as one of the options. When a detail button 802 is pressed in a state where "Secure print" is displayed on the output type selection region 801, the UI processing unit 405 displays a secure print detail dialog 820 illustrated in FIG. 8C.

A print setup region 803 related to an output form is a region that accepts, from the user, designation of various setup information related to a print output form. More specifically, the print setup region 803 related to an output form includes a region that accepts, from the user, designation of a print form, a paper output form, with or without punch, a paper output tray, and the like. The UI processing unit 405 reflects the setup information designated for the output form setup region 602 and the paper output setup region 604 to the print setup region 803 related to an output form and displays options in accordance with the setup information input to the property window 601. Note that the process for the print setup region 803 related to an output form performed by the UI processing unit 405 corresponds to an example of a first change process of changing a display item of a setting window used by a printer driver for setting setup information related to printing.

A print condition setup region 811 is a region that accepts, from the user, designation of various conditions related to printing. As a more specific example, the print condition setup region 811 includes a region that accepts, from the user, designation of setup information such as the output size, the number of copies, and the print orientation of a document to be printed. The print condition setup region 811 further includes a page layout setup region 815, a page number print setup region 816, and a date print setup region 817. The page layout setup region 815 is a region that accepts, from the user, designation as to whether or not to use a function related to a print layout such as a function of the Nin1 printing or a function of the poster printing. The page number print setup region 816 is a region that accepts, from the user, designation as to whether or not to print a page number as page modification. The date print setup region 817 is a region that accepts, from the user, designation as to whether or not to print date as page modification. The UI processing unit 405 reflects setup information input to the others setup region 605 to the print condition setup region 811. For example, when "Disable host side process" is designated for the internal spool process setup region 607, the UI processing unit 405 disables selection of "Poster print" out of options indicated in the page layout setup region 815. Note that the process for the internal spool process setup region 607 performed by the UI processing unit 405 corresponds to an example of a process of changing a display item of a setting window used by a printer driver for setting setup information related to printing. Further, in such a case, the UI processing unit 405 disables entry to the page number print setup region 816 and the date print setup region 817. In such a case, the process for the page number print setup region 816 and the date print setup region 817 performed by the UI processing unit 405 corresponds to another example of the first change process of changing a display item of a setting window used by a printer driver for setting setup information related to printing.

Further, as another example, the UI processing unit 405 may change the configuration of the UI related to setting of setup information related to printing in accordance with setup information based on entry to the property window 601. That is, the UI processing unit 405 may generate, as a setting window forming the UI, setting windows that are different from each other in accordance with whether or not "Enabled" is designated for the print processor setup region 608.

Here, a difference between UI transition when a print processor in step S902 is not used and UI transition that does not require pop-up display after setup information related to printing in step S903 is set will be described more specifically. First, the UI transition when a print processor is not used will be described. When "Secure print" is designated in the output type selection region 801, the UI processing unit 405 prompts the user to input a user name and a password number in the secure print detail dialog 820 displayed by the detail button 802 being pressed. The information processing device 101 then transmits print data to the printer device 102 when the OK button 804 is pressed in a state where the correct user name and the correct password number are input to the secure print detail dialog 820. Further, when the OK button 804 is pressed in a state where the detail button 802 is not pressed, and the user name or the password number is not input, the UI processing unit 405 displays the secure print detail dialog 820 after setup information related to printing is set. The UI processing unit 405 further prompts the user to input the user name and the password number for the secure print detail dialog 820. Note that, in such a case, the UI processing unit 405 may force the user to input the user name and the password number by suppressing acceptance of input of the OK button 821. Therefore, when the OK button 821 is pressed in a state where the correct user name and the correct password number are input to the secure print detail dialog 820, the information processing device 101 transmits print data to the printer device 102.

Next, the UI transition that does not require pop-up display after setup information related to printing is set will be described. When "Secure print" is designated in the output type selection region 801, the UI processing unit 405 immediately displays the secure print detail dialog 820 and prompts the user to input the user name and the password number. When the OK button 821 is pressed in a state where the correct user name and the correct password number are input in the secure print detail dialog 820, the information processing device 101 transmits print data to the printer device 102. On the other hand, when the cancel button 822 is pressed, the UI processing unit 405 performs a process of causing information designated for the output type selection region 801 to return from "Secure print" to the information obtained immediately before "Secure print" is designated. As described above, the UI processing unit 405 controls UI transition so that setting of setup information related to printing is not completed when the user name and the password number are left blank in secure print.

As described above, the UI processing unit 405 changes a display item of the setting window used for setting setup information related to printing by a printer driver and the transition order of the setting windows in accordance with whether or not "Enabled" is designated for the print processor setup region 608. Note that the UI processing unit 405 can perform at least any one of a process related to a change of a display item of the setting window described with reference to FIG. 8A to FIG. 8C and a process related to change of the transition order of a setting window described with reference to FIG. 9. That is, the UI processing unit 405 may change both of or only any one of the display item of the setting window described above and the transition order of the setting window described above in accordance with whether or not "Enabled" is designated for the print processor setup region 608.

According to the above scheme, when a print processor is used by the printer driver 404 for a process related to a print layout, the print processor 403 associated with the printer driver 404 is used. Thus, when a print processor is used for a process related to a print layout, setup information related to a print layout is correctly reflected to a print result. That is, it is possible to prevent a print result from being a result that the user does not intend to obtain.

Second Embodiment

As an example when a print processor used for printing is not a print processor associated with the printer driver 404, the example when setup information is changed by an administrator and the example when the printer driver 404 is upgraded have been described. When the printer driver 404 is newly installed, a print processor associated with the printer driver 404 is set. In contrast, when the printer driver 404 is updated from the older version to the newer version, setup information of a print processor set before the updating is taken over. Thus, as long as the administrator does not change setup information intentionally, a print processor associated with the printer driver 404 or a print processor prepared by the OS is used for printing. In other words, a state where a print processor associated with the printer driver 404 or a print processor prepared by the OS is not used for printing corresponds to a state where the administrator changes a print processor intentionally. In view of such a situation, in a process in which the printer driver 404 changes a print processor used for printing, it is necessary to consider a case where the administrator has intentionally changed a print processor to another print processor.

When the printer driver 404 is operated on a specific print system or a specific application, the printer driver 404 may be changed to use a print processor in order to avoid the influence due to an incorrect operation of the driver-related module 407. At this time, when the administrator intentionally further changes a print processor used by the printer driver 404, it is desirable to maintain the setup information related to a print processor changed by the administrator and control the driver-related module 407 so that the driver-related module 407 does not operate.

In view of the situation described above, features of the print system according to the present embodiment will be described below. Note that, in the present embodiment, a system configuration of a print system and respective hardware configurations and functional configurations of the information processing device 101 and the printer device 102 are the same as those of the first embodiment.

FIG. 10 is a flowchart illustrating an example of a flow of a series of processes when various setup information related to the printer driver 404 associated with the printer device 102 is set based on input to the property window 601 of the printer device 102 in the present embodiment. The information processing device 101 starts the series of processes when the OK button 609 is pressed.

In step S1001, the printer driver 404 acquires setup information designated for the print processor setup region 608 and determines whether or not "Enabled" is designated as the setup information. If the printer driver 404 determines that "Disabled" is designated in step S1001, the printer driver 404 ends the process of FIG. 10. That is, if "Disabled" is designated in the print processor setup region 608, the printer driver 404 does not perform the process of step S1002.

On the other hand, if the printer driver 404 determines that "Enabled" is designated in step S1001, the printer driver 404 proceeds with the process to step S1002. In step S1002, the printer driver 404 acquires the name of a print processor that is currently set (at the time of processing). In step S1003, the printer driver 404 determines whether or not the name of the currently set print processor matches a name of a print processor prepared by the OS.

In step S1003, if the acquired name (that is, the name of the currently set print processor) matches the name of the print processor prepared by the OS, the printer driver 404 proceeds with the process to step S1004. In step S1004, the printer driver 404 changes a print processor used for a process related to a print layout from the print processor prepared by the OS to the print processor 403 associated with the printer driver 404.

On the other hand, in step S1003, if the acquired name does not match the name of the print processor prepared by the OS, the printer driver 404 proceeds with the process to step S1005. In step S1005, the printer driver 404 determines whether or not the name of the currently set print processor matches a name of the print processor 403 associated with the printer driver 404. In step S1005, if the acquired name matches the name of the print processor 403 associated with the printer driver 404, the printer driver 404 determines that the appropriate print processor 403 is already set. Thus, the printer driver 404 does not change the print processor used for a process related to a print layout and ends the process of FIG. 10.

In contrast, in step S1005, if the acquired name does not match the name of the print processor 403 associated with the printer driver 404, the printer driver 404 proceeds with the process to step S1006. In step S1006, the printer driver 404 restricts a use of at least some of the functions of the print processor 403 and the driver-related module 407. As a more specific example, the printer driver 404 disables the function of the print processor 403 and the driver-related module 407. In such a case, the UI processing unit 405 updates information designated for the internal spool process setup region 607 to "Disable host side process". Accordingly, the information processing device 101 restricts a usable function in a process related to a layout, but does not change the setup information related to a print processor that is intentionally changed by the administrator, and suppresses the operation of the driver-related module 407. Note that the process of step S1006 corresponds to an example of a restricting process of restricting a use of at least some of the functions related to a layout for a case where setup information related to printing is set by a printer driver.

According to the scheme described above, as a print processor used for a process related to a print layout, setup information related to the print processor that has been intentionally changed by the administrator is not changed. Further, as a print processor used for a process related to a print layout, when the print processor 403 associated with the printer driver 404 has not been set, the operation of the driver-related module 407 is suppressed. Accordingly, it is possible to avoid the influence due to an incorrect operation of the driver-related module 407, and the setup information related to a print layout is correctly reflected to a print result. That is, it is possible to prevent a print result from being a result that the user does not intend to obtain.

Other Embodiments

The configuration of the print system according to each embodiment described above is only an example, and a part of the configuration may be appropriately changed without departing from the technical concept according to the present disclosure. For example, a process related to some of the functions of the information processing device 101 described above may be performed by another device that can operate in cooperation with the information processing device 101. As a more specific example, a process related to window generation of a UI performed by the UI processing unit 405 may be performed by another device. That is, in such a case, designation as to whether or not to use a print processor for a process related to a print layout may be performed via the UI displayed on a display device of another device. Further, in such a case, the GR processing unit 406 in the information processing device 101 may acquire setup information input to the UI from another device described above and, based on the setup information, may generate print data that can be interpreted by the printer device 102. Note that, in such a case, a process in which the information processing device 101 acquires the above setup information from another device corresponds to an example of an acquiring process for acquiring a selection result as to whether or not a print processor is used for a process related to a print layout.

According to the present disclosure, it is possible to prevent a print result from being a result that a user does not intend to obtain.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-109724, filed on Jun. 12, 2019, which is hereby incorporated by reference herein in its entirety.

What is claimed is:

1. An information processing device that includes an operating system, the information processing device comprising:
 a first determination unit configured to determine, as a first determination, whether, in setting information for a printer, the printer is set to use a print processor that is different from, and is not included in, a printer driver associated with the printer;
 a second determination unit configured to determine, as a second determination, whether the print processor set in the setting information for the printer, is a default print processor for the operating system, a driver print processor associated with the printer driver, or another print processor; and
 a setting unit configured to set a print processor,
 wherein, if the first determination unit determines that, in the setting information for the printer, the printer is set to use the print processor and the second determination unit determines that the print processor set in the setting information for the printer is the default print processor, the setting unit sets a driver print processor associated with the printer driver to the setting information for the printer instead of setting the default print processor to the setting information for the printer, and
 wherein, if the first determination unit determines that, in the setting information for the printer, the printer is set to use the print processor and the second determination determines that the print processor set in the setting information for the printer is not the default print processor, is not the driver print processor and is the another print processor, the setting unit does not change the setting information for the printer regarding a print processor, thereby the setting of the print processor set in the setting information for the printer is maintained.

2. The information processing device according to claim 1, wherein the driver print processor is a software module for layouting pages, where layouted pages are to be provided to the printer driver.

3. A method for an information processing device that includes an operating system, the method comprising:
 determining, as a first determination, whether, in setting information for a printer, the printer is set to use a print processor that is different from, and is not included in, a printer driver associated with the printer;
 determining, as a second determination, whether the print processor set in the setting information for the printer is a default print processor for the operating system, a driver print processor associated with the printer driver, or another print processor; and
 setting a print processor,
 wherein, if the first determination determines that, in the setting information for the printer, the printer is set to use the print processor and the second determination determines that the print processor set in the setting information for the printer is the default print processor, setting includes setting a driver print processor associated with the printer driver to the setting information for the printer instead of setting the default print processor to the setting information for the printer, and
 wherein, if the first determination determines that, in the setting information for the printer, the printer is set to use the print processor and the second determination determines that the print processor set in the setting information for the printer is not the default print processor, is not the driver print processor and is the another print processor, setting includes not changing the setting information for the printer regarding a print processor, thereby the setting of the print processor set in the setting information for the printer is maintained.

4. The method according to claim 3, wherein the driver print processor is a software module for layouting pages, where layouted pages are to be provided to the printer driver.

* * * * *